No. 628,794. Patented July 11, 1899.
C. L. GROHMANN.
SPEED CHANGING MECHANISM FOR SCREW MACHINES.
(Application filed Aug. 31, 1898.)
(No Model.) 2 Sheets—Sheet 1.

Witnesses
Chas. F. Schmelz
Heath Sutherland

Inventor
C. L. Grohmann,
By his Attorney
F. H. Richards.

No. 628,794. Patented July 11, 1899.
C. L. GROHMANN.
SPEED CHANGING MECHANISM FOR SCREW MACHINES.
(Application filed Aug. 31, 1898.)

(No Model.) 2 Sheets—Sheet 2.

Witnesses
Chas. F. Schmelz
Heath Sutherland

Inventor
C. L. Grohmann,
By his Attorney
F. H. Richards

UNITED STATES PATENT OFFICE.

CARL L. GROHMANN, OF HARTFORD, CONNECTICUT, ASSIGNOR TO THE PRATT & WHITNEY COMPANY, OF SAME PLACE.

SPEED-CHANGING MECHANISM FOR SCREW-MACHINES.

SPECIFICATION forming part of Letters Patent No. 628,794, dated July 11, 1899.

Application filed August 31, 1898. Serial No. 689,900. (No model.)

*To all whom it may concern:*

Be it known that I, CARL L. GROHMANN, a citizen of the United States, residing in Hartford, in the county of Hartford and State of Connecticut, have invented certain new and useful Improvements in Speed-Changing Mechanism for Screw-Machines, of which the following is a specification.

My invention relates to mechanism for changing the speed of a part of a machine and to means for controlling the action of said mechanism, and it is shown applied to a screw-machine of the ordinary "turret" type, although, as is obvious, it may be employed wherever needed to accomplish the same or analogous results.

Primarily the object of the invention is to impart a slow-feed motion to the part of the machine desired and a quick-return movement after the feed has been accomplished, and in the construction illustrated this object is accomplished by a shaft carrying a main driving member loosely mounted thereon and equipped with clutch teeth or pins. Located in the web of this driving member is a pin or stud, upon which is loosely journaled for axial rotation a pinion having relatively long teeth which intermesh with two gears of the same diameter, one of said gears varying in number of teeth from the other and one being fixed to and the other loosely mounted upon a shaft carrying a worm to which it is desired to impart rotation.

Suitable clutch and auxiliary driving members are mounted upon the worm-carrying shaft. A pawl is provided to prevent backward action of the pinion, loosely mounted upon said shaft, and automatic mechanism is employed for shifting the clutch at the proper intervals to cause the main driving member to impart, respectively, a slow and a fast motion to the shaft which it operates.

Figure 1:
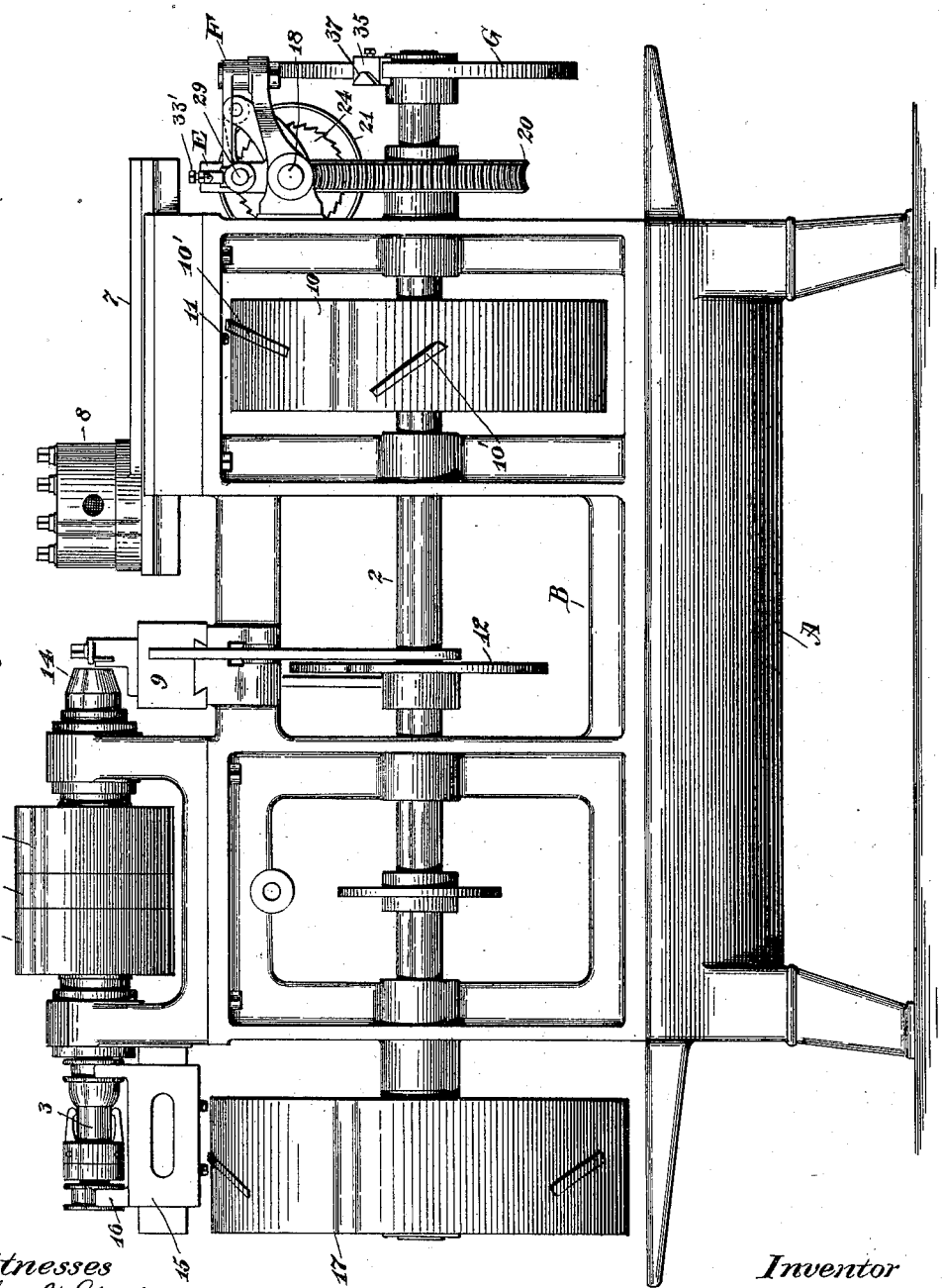
Figure 2:
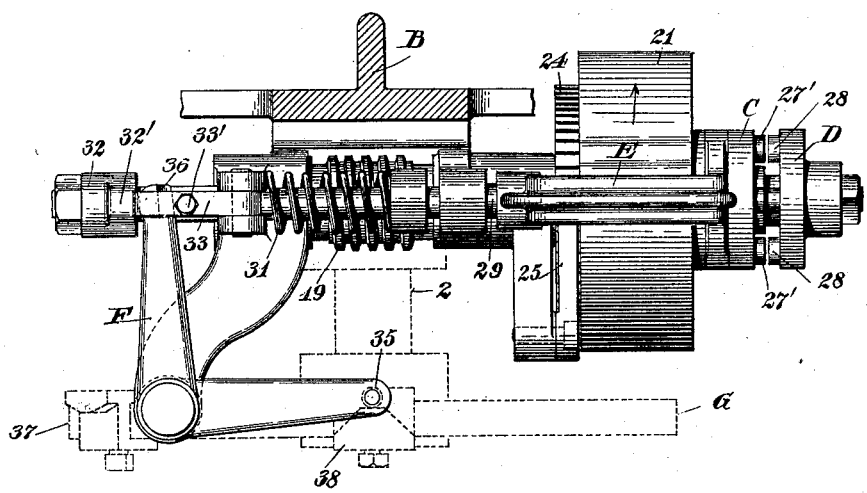
Figure 3:
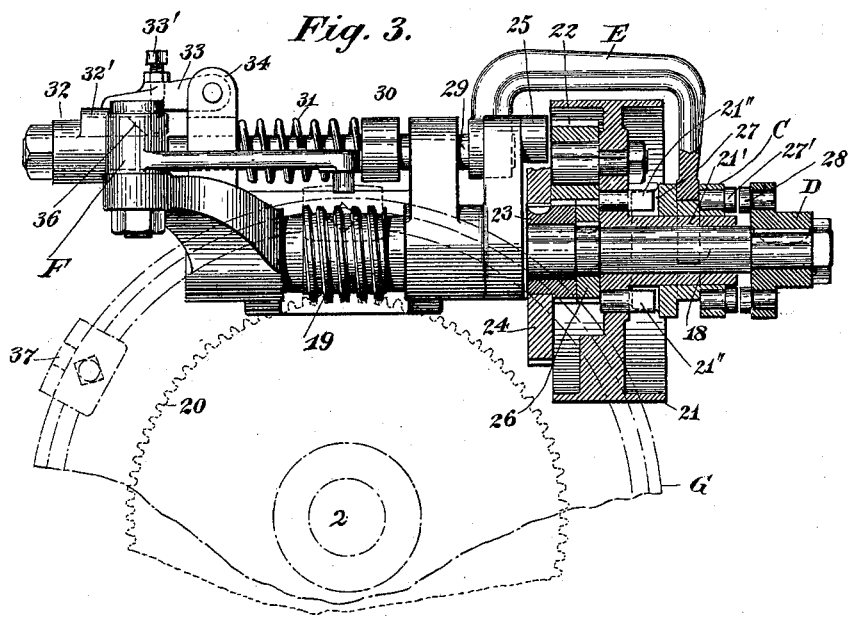

In the drawings accompanying and forming part of this specification, Figure 1 is a side elevation of a screw-machine of the ordinary turret type, showing my invention applied thereto. Fig. 2 is a plan view, part of the framing of the machine being shown in section, of the speed-changing mechanism and the means for controlling the action of said mechanism; and Fig. 3 is a front elevation of said speed changing and controlling devices, certain parts being shown in section.

Similar characters designate like parts in all the figures of the drawings.

For supporting the different elements of the machine a main frame A and an auxiliary frame B are employed, and the last-named frame directly sustains the driving-shaft and work-holding spindle.

Embodied in the machine are the usual cam-shaft 2 and chuck-spindle 3, having blank feeding, gripping, and rotating devices, (the latter being designated by 5 and the idle pulleys by 4 and 6,) the slide 7 carrying the turret 8, which is to be equipped with the usual tools and to be intermittently rotated by well-known means, and the cross-slide 9, on which the usual cutting-off tool is mounted.

Common means are shown for reciprocating the turret-slide 7, and these means consist of the cam-wheel 10, provided with cam surfaces or strips 10' 10', which engage a stud 11, depending from the turret-slide and actuate said slide first in one direction and then in the other, and common means are also illustrated for operating the cutting-off tool, and said means consist of the cam 12, carried by shaft 2, which through the medium of an intermediate lever actuates the slide 9, on which said tool is mounted.

Mechanism for opening and closing the work-holding chuck 14 and for feeding the rod through said chuck when necessary is employed, and this mechanism is operated by the slides 15 and 16, actuated in proper order by the cam 17, carried by the shaft 2. These devices are of well-known construction, and therefore constitute no part of my invention.

In the machine illustrated improved speed-changing devices and adjunctive mechanism are provided for imparting a slow-feed movement to the turret-slide 7 of the machine and a rapid-return motion of said slide after said feed movement has been effected, and to accomplish these objects the mechanism now to be described is employed.

Journaled in brackets of the auxiliary frame

B and extending transversely of said frame is a shaft 18, carrying a worm 19, which intermeshes with the worm-wheel 20, secured to one end of the cam-shaft 2.

Loosely mounted on the shaft 18 is a driving-pulley 21, and sleeved on a stud projecting from the web of said pulley is a pinion 22, having relatively long teeth. Pulley 21 is provided with a long hub 21', which is loosely fitted on shaft 18, and also loosely mounted on said shaft is a gear 23, having attached thereto or rigid therewith a ratchet-wheel 24, with which a pawl 25, pivoted to the framework, engages. Fixedly secured to the shaft 18 is a gear 26, of the same diameter as the loose gear 24, but having a different number of teeth. In the construction illustrated the gear 23 is provided with fifty teeth, while the gear 26 has fifty-one teeth; but these numbers can be varied as circumstances require.

Any suitable speed-reducing mechanism may be carried by the shaft, and the invention is not limited to that shown.

Projecting from the web of the pulley 21 are a series of clutch-pins 21'', and loosely mounted on the hub of said pulley is a clutch or other suitable coupling member C, which is provided with clutch-engaging surfaces 27 at one end and with pins 27' at its other end, said clutch-surfaces 27 being in constant engagement with the clutch-pins 21'' of the pulley 21.

Keyed to the extreme end of the shaft 18 is a sleeve D, having pins 28.

Clutch-coupling C is grooved circumferentially to receive the fork of a yoke E, attached to the end of a shipper-rod 29, which is mounted for sliding movement in the brackets in which the shaft 18 is journaled. By placing this yoke over the pulley 21 in the manner illustrated the belt, which is driven by the usual shafting and pulley above the machine, may readily be shipped on and off without unlacing the same. Attached to said rod 29 is a collar 30, and between said collar and a post or upright 34 of the machine is a coiled spring 31. Another collar 32 is attached to the left-hand end of the rod 29, and said collar is provided with a catch or abutment 32', with which a pawl 33, pivoted to the post or upright 34, engages, said pawl being provided with a set-screw 33', for a purpose hereinafter described.

Pivoted on a bracket projecting from the machine is an elbow-lever F, one arm of which is provided with an antifriction-roller 35 and the other arm with an inclined portion 36, which at the proper time will come into contact with the set-screw 33' and lift the pawl 33, thereby releasing the shipper-rod 29 and permitting it to be impelled to the right by the spring 31 to shift the clutch-coupling C into contact with the auxiliary driver or clutch device D.

Attached to one end of the cam-shaft of the machine is a cam-wheel G, having a series of adjustable cam-faces 37 and 38, arranged in sets with relation to each other, two of said faces being illustrated by dotted lines in Fig. 2.

It will be observed, as above stated, that the teeth 27 of the clutch-coupling C are in constant engagement with the clutch-teeth 21'' of the pulley 21, thereby causing said clutch to rotate continually with said pulley and to acquire the momentum of the same, the result being that when the coupling is shifted to connect with the auxiliary driver or clutch device D, thereby to lock all of the parts to the shaft, the movement of the driver D and the inertia of the clutch rotating therewith become effective in aiding and producing the quick-return motion of the turret-slide 7. This is a distinct advantage over constructions in which the inertia of the clutch-coupling acts to retard instead of assist the quick-return movement of that part of the machine governed by said coupling. Another advantage resides in the fact that by this construction the clutch-coupling is prevented from chattering or from "lost motion" on the shaft, and the teeth 27' thereof will therefore much more readily engage the teeth 28 of the auxiliary device D when the coupling is shifted to cause the quick return of the slide, all the devices being then locked to the shaft and rotating together, as above stated.

By extending the hub of the pulley 21 in the manner illustrated and by mounting the clutch-coupling C thereon a greater wearing-surface of the parts just mentioned is obtained. As is obvious, the shaft 18 rotates more slowly than the pulley 21, and by extending the hub of said pulley in the manner shown it is not necessary to carry the shaft out so far as would otherwise be the case. Furthermore, the clutch-coupling and the pulley always travel at the same speed, and the result is that no wear to speak of is caused between the parts, the limited sliding movement of the clutch not causing the same.

In operation power is applied to the main pulley or driver 21, causing the planet-gear 22 to travel around the sun-gears 23 and 26. During this operation the tendency of the pinion 22 is to rotate the rear gear 23 backward, but this being prevented by the ratchet and pawl 24 and 25 it is clear that the teeth of said pinion, which also engage with the gear 26, fixed to the shaft 18, will cause the same to be rotated a distance equaling the width of one tooth for every complete revolution of the pinion 22, thereby imparting a slight feed motion to the worm 19 and worm-wheel 20. At the completion of the feed movement of the turret-slide the cam-face 37 on the wheel G comes into contact with antifriction-roll 35 on one arm of the lever F, causing the inclined surface on the other arm of said lever to ride under the screw 33' and lift the pawl 33 from its seat 32', thereby permitting the spring 31 to recoil and throw the shipper-rod 29, connected with clutch-coupling C, as before described, to the right, such action engaging the clutch-pins 27' of said coupling with similar pins on the sleeve D, fixed to the shaft 18, and causing a rapid rotation of all the parts and a quick return of the turret-slide, the teeth of the ratchet-wheel 24 slippling under the pawl 25. As the slide is returned quickly to its normal position the cam-face 38 on the other side of the wheel G comes into contact with antifriction-roller 35 and restores the parts to their normal positions, (shown in Figs. 2 and 3,) thereby throwing the slow-feed movement into action, and these movements of the parts proceed alternately and automatically and in proper order while the machine is in use.

Any suitable form of clutch mechanism may be employed, the invention not being limited to the particular form described.

Having described my invention, I claim—

1. In combination, a shaft; speed-reducing gearing mounted thereon; a main driver having a clutch-face and provided with a hub sleeved to said shaft; a clutch loosely mounted on said hub and in constant engagement with the main driver; an auxiliary driver fixed to the shaft and provided with a clutch-surface; and means for actuating the clutch.

2. In combination, a shaft; speed-reducing gearing mounted thereon; a main driver having a clutch-face and provided with a hub sleeved to said shaft; a clutch loosely mounted on said hub and in constant engagement with the main driver; an auxiliary driver fixed to the shaft and provided with a clutch-surface; and means for automatically actuating the clutch.

3. In combination, a shaft; a main driver having a long hub loosely mounted on said shaft; two gears, one loose on, and the other fixed to, said shaft, one of said gears differing in number of teeth from the other; means for preventing the backward rotation of one of said gears; a pinion carried by the main driver and engaging with said gears; a clutch loosely mounted upon the hub of the main driver and in constant engagement therewith; an auxiliary driver fixed to the shaft and having a clutch-surface; and means for actuating the clutch.

4. In combination, a shaft; a main driver provided with clutch-teeth and having a long hub loosely sleeved upon said shaft; an auxiliary driver fixed to the shaft and provided with a clutch-surface; a clutch loosely sleeved upon the hub and in constant engagement with the main driver; speed-reducing gearing carried by the shaft; a shipper-rod connected with the clutch; and means for automatically actuating said shipper-rod to cause the same to throw the clutch into engagement with the auxiliary driver at the proper time to effect a quick reverse movement of the shaft.

5. In combination, a shaft; a main driver having clutch-teeth and provided with a long hub sleeved on said shaft; an auxiliary driver also having clutch-teeth; a clutch in constant engagement with the clutch-teeth of the main driver; a pinion carried by the main driver; two gears differing in number of teeth from each other, one of said gears being fixed to, and the other loosely mounted on, said shaft; means for preventing the backward rotation of one of said gears; a shipper-rod having a yoke extending over the main driver and connected with the clutch; and means for actuating said shipper-rod to throw the clutch into engagement with the auxiliary driver at the proper time.

6. In combination, a shaft; a main driver having a long hub loosely sleeved upon said shaft; a pinion carried by said main driver; two gears, one differing in number of teeth from the other, said gears being respectively fixed to, and loose on, said shaft; means for preventing the backward rotation of the loosely-mounted gear; a clutch having teeth in constant engagement with similar teeth on the main driver; an auxiliary driver having clutch-teeth adapted to engage at the proper time with similar teeth on the clutch; a shipper-rod having a yoke connected with said clutch; a spring for shifting said rod in one direction; a detent carried by the rod; a pawl adapted to engage with said detent; and means for lifting the pawl to release the shipper-rod.

7. In combination, a shaft; a main driver having a long hub loosely sleeved upon said shaft; a pinion carried by said main driver; two gears, one differing in number of teeth from the other, said gears being respectively fixed to, and loose on, said shaft; means for preventing the backward rotation of the loosely-mounted gear; a clutch having teeth in constant engagement with similar teeth on the main driver; an auxiliary driver having clutch-teeth adapted to engage at the proper time with similar teeth on the clutch; a shipper-rod having a yoke connected with said clutch; a spring for shifting said rod in one direction; a detent carried by the rod; a pawl adapted to engage with said detent; a lever having an inclined face for actuating said pawl; and a cam for operating the lever.

8. In combination, with a cam-shaft and a worm-wheel thereon, a worm-shaft; a main driver having a long hub loosely mounted on said worm-shaft; speed-reducing gearing carried by said worm-shaft; means carried by the main driver for actuating the speed-reducing gearing; a clutch-surface on the main driver; an auxiliary driver having a clutch-surface fixed to the worm-shaft; a clutch sleeved on the hub of the main driver and normally in constant engagement with the clutch-surface of said driver; and means for automatically actuating said clutch.

9. In combination, a turret-slide; a shaft having a cam for actuating said slide in both directions; means for operating said shaft; a main driver having a long hub; speed-reducing gearing on said shaft-operating means, actuated by the main driver; an auxiliary driver; a clutch sleeved on the hub and in constant engagement with the clutch-surface of the main driver and adapted to be thrown into engagement with a similar surface of the auxiliary driver; and means for automatically actuating said clutch.

CARL L. GROHMANN.

Witnesses:
R. M. HANNAFORD,
HENRY BISSELL.